United States Patent
Leyendecker et al.

(10) Patent No.: US 8,903,217 B2
(45) Date of Patent: *Dec. 2, 2014

(54) DEVICE AND METHOD FOR SYNCHRONIZING DIFFERENT PARTS OF A DIGITAL SERVICE

(75) Inventors: Philippe Leyendecker, Chateaugiron (FR); Rainer Zwing, Villengen (DE); Franck Abelard, Saint Armel (FR); Patrick Morvan, Laille (FR); Sébastien Desert, Rennes (FR); Didier Doyen, La Bouexiere (FR)

(73) Assignee: Thomson Licensing, Issy-les moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,078

(22) Filed: Jun. 14, 2012

(65) Prior Publication Data

US 2013/0242191 A1    Sep. 19, 2013

Related U.S. Application Data

(62) Division of application No. 11/667,499, filed on Oct. 24, 2007, now Pat. No. 8,606,070.

(30) Foreign Application Priority Data

Nov. 16, 2004  (EP) .................................... 04292712
Nov. 16, 2004  (FR) .................................... 04 12169
Jan. 7, 2005   (EP) .................................... 05100072

(51) Int. Cl.
*H04N 5/932*    (2006.01)
*H04N 5/06*     (2006.01)

(52) U.S. Cl.
CPC ...................................... *H04N 5/06* (2013.01)
USPC .......................................... 386/201; 386/285

(58) Field of Classification Search
CPC ............. H04N 5/00; H04N 5/04; H04N 5/08; H04N 5/932
USPC .......................... 386/200, 201, 207, 284, 285
See application file for complete search history.

(56) References Cited

U.S. PATENT DOCUMENTS 5,910,806 A    6/1999   Narui et al.
6,055,247 A    4/2000   Kubota et al.
(Continued)

FOREIGN PATENT DOCUMENTS

CN    1206536 A    1/1999
CN    1520181      8/2003
(Continued)

OTHER PUBLICATIONS

VESA: "VESA Plug and Display Standard Version 2.0", Video Electronics Standards Ass., Jun. 11, 1997, sections 1.3.1 and 4.2.3.

*Primary Examiner* — Huy T Nguyen
(74) *Attorney, Agent, or Firm* — Robert D. Shedd; Jeffrey M. Navon

(57) ABSTRACT

The invention relates to a reproduction device (21), with a device (20) acting as a source of digital services. It also relates to a method of synchronizing two parts of a digital service in a system including a source device according to the invention and at least one reproduction device according to the invention.

According to the invention, the reproduction device (21) includes means for receiving the data forming at least a part of a digital service originating from a digital service source device (20), means for processing (210) at least some of the data received, means (211) for reproducing an output of at least a part of the digital service, the time for processing and reproducing the data introducing a delay in the output of the reproduced data. This device also includes communication means (213) for informing the source device of the delay introduced.

10 Claims, 10 Drawing Sheets

(56) References Cited

U.S. PATENT DOCUMENTS

| | | |
|---|---|---|
| 6,577,462 B1 * | 6/2003 | Hamada et al. .............. 360/51 |
| 6,778,493 B1 | 8/2004 | Ishii |
| 7,136,399 B2 | 11/2006 | Lanigan |
| 2002/0140859 A1 | 10/2002 | Kariatsumari et al. |
| 2002/0174440 A1 | 11/2002 | Usuba et al. |
| 2006/0012710 A1 | 1/2006 | Sasaki |
| 2006/0072399 A1 | 4/2006 | Fujimoto et al. |

FOREIGN PATENT DOCUMENTS

| | | |
|---|---|---|
| EP | 1067773 A | 1/2001 |
| EP | 1443773 | 1/2004 |
| EP | 1603336 A | 12/2005 |
| JP | 2001-136138 A2 | 5/2001 |
| JP | 2002-290932 A | 10/2002 |
| JP | 2002-344898 A | 11/2002 |
| JP | 2003-520006 A | 6/2003 |
| JP | 2004-282667 A | 10/2004 |
| JP | 2006-33436 A | 2/2006 |
| WO | 97/17798 | 5/1997 |
| WO | 2004/077825 A | 10/2004 |
| WO | 2005/099251 A | 10/2005 |

* cited by examiner

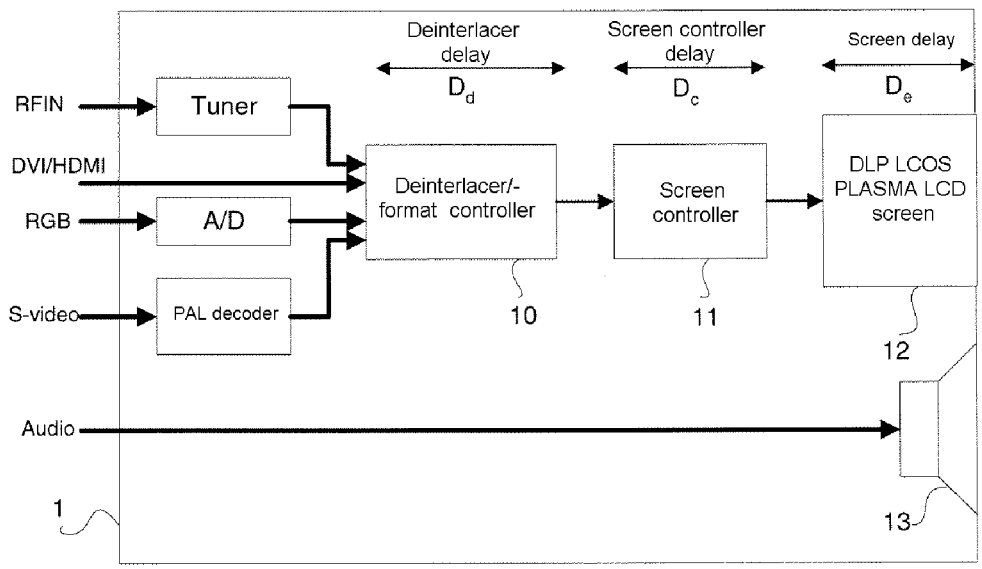
FIG. 1: State of the art
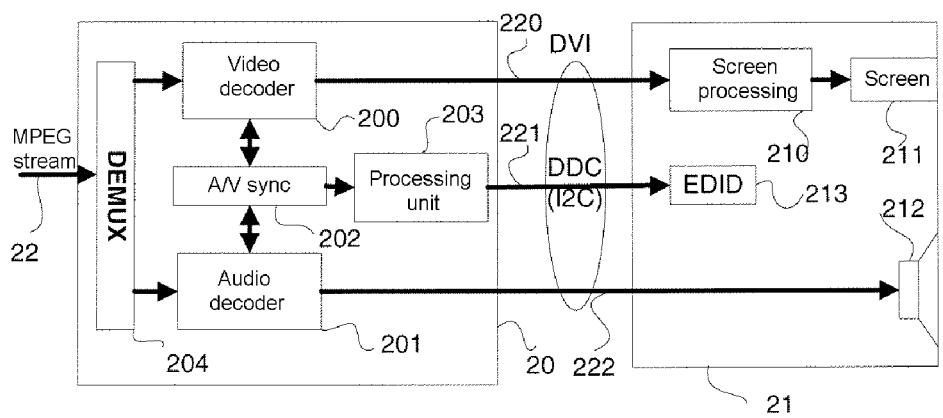
FIG. 2

DEVICE AND METHOD FOR SYNCHRONIZING DIFFERENT PARTS OF A DIGITAL SERVICE

This application is a divisional of U.S. application Ser. No. 11/667,499, filed Oct. 24, 2007, now U.S. Pat. No. 8,606,070 herein incorporated by reference.

1. FIELD OF THE INVENTION

The invention relates to a device and method for synchronizing different parts of a digital service. The invention may, for example, relate to the audio/video synchronization of an audiovisual digital service.

2. DESCRIPTION OF THE PRIOR ART

For many years, screen-related technologies were based on cathode ray tube screens. These technologies were then purely analogue. Since the 1990s, digital technologies have become more and more prevalent in the image system from acquisition by the camera of the video signal through to its display on the screens (for example, 100 Hz screens using motion compensation). Initially, none of these new technologies introduced any meaningful delay on the video. The audio/video (hereinafter denoted A/V) synchronization is performed by the decoder, based on the assumption that the audio and video streams supplied by the decoder are reproduced by the audiovisual reproduction device instantaneously. In the case of the decoders, the A/V synchronization principle consists in using time markers ("Program Clock References" and "Presentation Time Stamps") embedded by the MPEG encoder in the audio and video packets, enabling the decoder to present the video and audio relative to a common time reference. Appendix D of the ISO/IEC 13818-1 standard describes in detail how to perform this A/V synchronization (called "LIPSYNC"). Today, the procedure for tuning the A/V synchronization module of a decoder consists in decoding audio and video packets derived from a test MPEG stream and presenting them to a reproduction device (for example a CRT television) for which the response time is considered to be instantaneous. Similarly, in the case of DVD players, the A/V synchronization is handled by the player itself which ensures the synchronization of the audio and video streams at the output of the player.

Through recent advances in screen technology, a range of new screens and more or less complex audiovisual reproduction devices have been able to be marketed, including:
  Audiovisual reproduction devices ("home cinema" for example), in which the audio signal can be supplied in a decoded form (PCM—pulse-code modulation—format) or in an encoded form (for example, Dolby Digital).
  High definition (hereinafter denoted HD) television which is becoming more and more popular in certain countries. It could become a consumer market with, for example, the MPEG-4 technology to reduce the costs. A number of HD formats ought to coexist with the standard definition (hereinafter denoted SD) format. The HD format requires significant video processing in the screen before displaying the video, which can introduce delays.
  Numerous screen technologies (for example LCD, LCOS, DLP, Plasma, etc) are available on the market for both HD and SD formats. These various screens require their own video processors for optimal rendition, and can thus introduce delays.

In the past, studies on the audiovisual system have shown that the human being is sensitive to A/V phase shifts. The study carried out by Bell laboratories in 1940 thus showed that difficulties arise with an audio delay greater than 100 ms or an audio advance greater than 35 ms. In practice, the human being is naturally more tolerant to an audio delay than to an advance because it is not natural to hear a sound of an event before seeing it displayed on the screen. Consequently, and to have common rules, the ITU standardized the acceptable and unacceptable A/V synchronization errors throughout the A/V system. In 1993, the ITU[DOC11/59] standard defined the detectability range as being an audio delay greater than 100 ms or an audio advance greater than 20 ms. The objectionability range is defined as being an audio delay greater than 160 ms or an audio advance greater than 40 ms. In 1998, for no particular reason, the ITU relaxed the detectability range to an audio delay greater than 125 ms or an audio advance greater than 45 ms. The objectionability range is then defined as being an audio delay greater than 185 ms or an audio advance greater than 90 ms. These ranges are defined by the ITU-R BT 1359-1 standard.

Today, the ATSC ("Advanced Television System Committee", an international organization for developing digital television standards) indicates that this standard is not suitable and does not conform to the study carried out by BELL. It therefore proposes to standardize the synchronization errors within the range [−90 ms, +30 ms] to be distributed over the A/V system as follows: [−45 ms, +15 ms] for acquisition and [−45 ms, +15 ms] for the encoder/decoder/TV.

Today, video reproduction devices (for example, LCD screens) introduce delays measured in tens of milliseconds (often nearly a hundred) in the video processing system. The delay introduced can vary significantly from one device to another, and it can also vary according to the format of the image which can be interlaced (for example 576i25 for SD or 1080i25 for HD) or progressive (for example 576p25 for SD or 720p50 for HD), particularly when the screen is fitted with a deinterlacing function. These processes require the use of image memories (for example, FIFOs, SDRAM, etc) which consequently increase the delays on the video signal compared to the audio signal. This means that an audio signal often precedes the video signal with which it is associated. In practice, for their part, the audio reproduction devices do not usually introduce a significant delay in normal use. They can introduce delays if sound effects are added. However, these delays remain tolerable to the user.

Unlike cathode ray tube screens, the new flat screens currently used do not therefore respond instantaneously. In practice, their various component modules introduce delays. FIG. 1 shows, in the form of blocks 10, 11 and 12, certain modules of an audiovisual reproduction device 1 (for example, a flat screen television) according to the state of the art. This device includes a video reproduction device 12 (for example a screen) and an audio reproduction device 13 (for example, an external or built-in speaker). The conventional modules of the video reproduction device (for example, a tuner, a PAL decoder and A/D converters) will not be described any more. The modules 10, 11 and 12 introduce video delays which can be fixed or variable from frame to frame. These delays vary according to the processing applied and according to the screen type. If they are not compensated, they will provoke A/V synchronization errors that can be detected by the users because they are situated outside the tolerance range as defined previously.

The first deinterlacing and format control module 10 converts an interlaced video into a progressive video and adjusts the resolution of the input signal to that of the screen (for example, switching from 1920×1080i to 1280×720p). This block uses a frame memory (SDRAM, DDRAM) which introduces a variable delay ($D_d$) according to the video format (interlaced/progressive, 50 Hz/60 Hz).

The second screen controller module 11 converts a progressive video into a compatible format for the screen. The controller addresses the screen and also performs image quality enhancement processes. These often introduce delays $D_c$ which depend on the type of screen.

Thus, in the case of LCD-LCOS screen (LCD standing for "Liquid Crystal Display" and LCOS standing for "Liquid Crystal on Silicon"), it is possible to apply the following processes which introduce delays:

Overdriving, to enhance the response times of the liquid crystal when it needs to switch from one grey level to another. This operation which uses a frame memory introduces a fixed delay Rc_lcd_overdriving.

The frame duplication in the three-valve LCOS systems is routinely used to reduce the large area flicker effects. This operation, which uses a frame memory, introduces a fixed delay Rc_lcos_double.

In DLP™-LCOS (DLP stands for "Digital Light Processing") sequential colour screens, the following processes and operations introduce delays:

The conversion to sequential colour performed using a frame memory which introduces a fixed delay Rc_dlp-lcos sequential.

The DLP screen addressing performed by successive bit planes. This operation introduces a fixed delay Rc-dlp_bitplane.

For plasma screens, the following processes and operations introduce delays due to:

The screen addressing by successive subscanning operations. This introduces a delay Rc_plasma_bitplane.

The motion compensation to reduce false contour effects and blurring effects. This operation, which uses a frame memory, introduces a fixed delay Rc_plasma_artefact.

Similarly, the OLED (Organic Light Emitting Diode) screens can introduce delays.

The third module 12 comprises the screen itself. The light emitted by the LCD/LCOS screen is obtained by modulating the voltage applied to the liquid crystal. In the case of a DMD™ (Digital Micro-mirror Device), the light is binary-modulated using pivoting micro-mirrors. In the case of a PLASMA panel, the light is also binary-modulated by gas excitation. The light therefore reacts with a delay relative to the modulation. This delay depends mainly on the physical properties of the components of the screen (liquid crystal, gas, etc). Furthermore, some screens also incorporate an internal memory (DLP-LCOS sequential) which provokes an additional delay. The screen therefore introduces delays $D_e$ directly linked to its type.

Thus, the LCD-LCOS screens introduce, among other things, the following delays:

Since the screen is addressed row by row, the last row is refreshed one frame period after the first row. This addressing operation introduces a fixed delay Re_lcd_addressing.

The liquid crystal takes a certain time to be set up after application of the modulation voltage. This time is broken down into a delay and a setup time. These 2 times depend on the grey transition level between the preceding frame and the current frame. These two times are added together to give a variable delay Re_lcd_liquid-crystal.

Other screen types (for example plasma panels, DLP, OLED) can introduce other delay types.

Thus, the plasma screens introduce, among other things, the following delay:

The gas enclosed in the screen has a response time which varies according to the video content and which therefore corresponds to a variable delay Re_plasma_gas.

The DLP™ screens introduce in particular the following delays:

The display device contains an internal memory and is addressed in subscanning form. This introduces a fixed delay Re_dlp_addressing.

The DMD™ has very fast response times. It introduces no particular delay.

The table below summarizes examples of various delay types for different screens. In the table, T represents the frame period (20 ms/50 Hz, 16.7 ms/60 Hz).

| Delays (D) | LCD | 3-LCOS | PLASMA | DLP ™ | 1-LCOS 6 × (300 Hz/ 360 Hz) |
|---|---|---|---|---|---|
| Deinterlacer (delay $D_d$) | 0 for progressive video T for interlaced video | 0 for progressive video T for interlaced video | 0 for progressive video T for interlaced video | 0 for progressive video T for interlaced video | 0 for progressive video T for interlaced video |
| Controller (delay $D_c$) | | | | | |
| Rc_lcd_overdriving | T | T | | | |
| Rc_lcos_double | | T | | | |
| Rc_dlp_lcos_sequential | | | | T | T |
| Rc_dlp_bitplane | | | | T | |
| Rc_plasma_bitplane | | | T | | |
| Rc_plasma_artefact | | | 2T | | |
| Screen (delay $D_e$) | | | | | |
| Re_lcd_addressing | T | T | | | <T/6 |
| Re_lcd_liquid-crystal | T–>3T | T–>3T | | | |
| Re_plasma_gas | | | T/2 | | |
| Re_dlp_addressing | | | | T/6 | |
| Total | 3T–>6T | 4T–>7T | 3.5T–>4.5T | 2–>3T | <3T |
| 50 Hz → T = 20 ms | 60 ms →120 ms | 80 ms →140 ms | 70 ms →90 ms | 40 ms →60 ms | <60 ms |
| 60 Hz → T= 16.7 ms | 50 ms →100 ms | 70 ms →117 ms | 60 ms →75 ms | 30 ms →50 ms | <50 ms |

Depending on the screen technologies used, it is therefore possible to have delays on the video that are more or less significant, fixed or variable from frame to frame according to the content of the image (for example the grey levels). These delays can also vary according to the video format. In the case of television or DVDs, there are four possible formats:

50 Hz interlaced input;
50 Hz progressive input;
60 Hz interlaced input;
60 Hz progressive input.

These delays between the audio and video streams also depend on the audio format that is used (for example, MPEG1, MPEG2 layer 1 and 2, DOLBY AC-3). They can provoke out-of-tolerance A/V synchronization errors (in other words errors beyond the tolerance range) that can be extremely objectionable to the user.

The above analysis shows that it is therefore necessary to synchronize the A/V streams in order to improve the perception comfort of the user and to keep the delay (or advance) in the reproduction of the video stream relative to the audio stream within the tolerance range defined by the standards. More generally, it is necessary to synchronize the various parts of a digital service in order to keep the delay (or advance) in the reproduction of one of the parts of the service relative to the other within a tolerance range for this delay (or this advance) not to be objectionable to the user.

3. SUMMARY OF THE INVENTION

The object of the invention is to overcome these drawbacks in the prior art. To this end, the present invention proposes a device and a method of synchronizing a number of parts of a digital service which take into account delays introduced by the various processes applied to at least a part of the digital service and delays introduced by the reproduction devices themselves. The aim is to avoid departing from the tolerance ranges which would be objectionable to the user.

To this end, the invention proposes a device for reproducing data corresponding to at least one digital service including means for receiving data forming at least a part of a digital service originating from a digital service source device, means for processing at least a part of the data received, means for reproducing an output of at least a part of the digital service, the time for processing and reproducing the data introducing a delay in the output of the reproduced data. According to the invention, the reproduction device also includes communication means for informing the source device of the delay introduced.

According to a preferred embodiment, the reproduction device is a television, the digital service is an audiovisual service, and the processed data is video data organized in frames. Moreover, one of the means for reproducing an output of at least a part of the digital service is a screen, preferably a flat screen such as a liquid crystal display (LCD) screen, a plasma screen, an OLED screen or a DLP screen.

According to a particular characteristic, one of the means for processing at least a part of the data received is a deinterlacer.

Advantageously, a value for the delay is stored in a non-volatile memory of the reproduction device. According to a particular characteristic, the non-volatile memory is an EPROM memory.

According to a preferred embodiment, a value of the delay is presented in the form of an EDID descriptor.

Preferably, the communication means for informing the source device of the delay introduced include a link using the DDC protocol or the CEC protocol. The decoder recovers the delay value stored in EDID descriptor form via a DDC link.

The invention also relates to a device acting as a digital service source, including means for outputting data forming a first part of a digital service, second means for outputting the data forming a second part of the digital service, and means for communicating with a device for reproducing the data forming the first part of the digital service. The source device also includes means for applying a programmable delay to the output data forming the second part of the digital service, means for receiving from the device for reproducing the data forming the first part of the digital service a delay indication and means for programming the means for applying a programmable delay according to the delay indication received.

According to a particular embodiment, the device acting as a source of digital services is a digital decoder. According to another embodiment, the device acting as a source of digital services is a DVD player.

According to a preferred embodiment, the data forming the first part of the digital service is video data and the data forming the second part of the digital service is audio data.

According to another embodiment, the data forming the first part and the second part of the digital service is video data.

Preferably, the means for applying a programmable delay compensate for a delay due to one or more following elements of the reproduction means:

a module for deinterlacing the video data (10);
a format controller (10);
a screen controller (11);
a screen (12).

According to a particular characteristic, the means for applying a programmable delay contain a memory which temporarily stores the data forming the second part of the digital service before restoring it according to the delay indication received.

Finally, the invention relates to a method of synchronizing two parts of a digital service in a system including a source device and at least one reproduction device, in which the source device includes first means for outputting the data forming the first part of the digital service, second means for outputting the data forming the second part of the digital service, means for communicating with the device for reproducing the data forming the first part of the digital service, means for applying a programmable delay to the output data forming the second part of the digital service, and in which the reproduction device includes means for receiving the data forming at least a first part of the digital service originating from the digital service source device, means for processing at least a part of the data received to reproduce at least a part of the digital service, including the following steps:

on the reproduction device side, transmitting to the source device the total delay introduced by the reproduction device when processing and reproducing the received data forming at least a first part of the digital service; and on the source device side, programming the programmable delay, using the delay indications received, to delay the output of the data forming the second part of the digital service.

According to a particular embodiment, a part of the delay is due to the characteristics of the screen and can be estimated for each frame in the case of liquid crystal screens according to the following steps:

Computation for each pixel of the grey level difference between two successive frames;

Estimation for each pixel of the response time between said two successive frames from said grey level difference computed for said pixel;

Creation of a histogram of the delays on all of the pixels;
Computation of an average delay from said histogram.

According to a particular characteristic, the data forming the first part of the digital service is video data and the data forming the second part of the digital service is audio data.

According to another characteristic, the data forming the first part of the digital service and the second part of the digital service is video data.

4. DESCRIPTION OF THE DRAWINGS

The invention will be better understood and illustrated by means of advantageous exemplary embodiments, by no means limiting, with reference to the appended figures in which:

FIG. 1, already described, shows a diagram of a flat screen television according to the state of the art;

FIG. 2 represents a device for receiving and reproducing an audio/video digital service according to the invention which uses an internal audio reproduction device;

Figure 14:
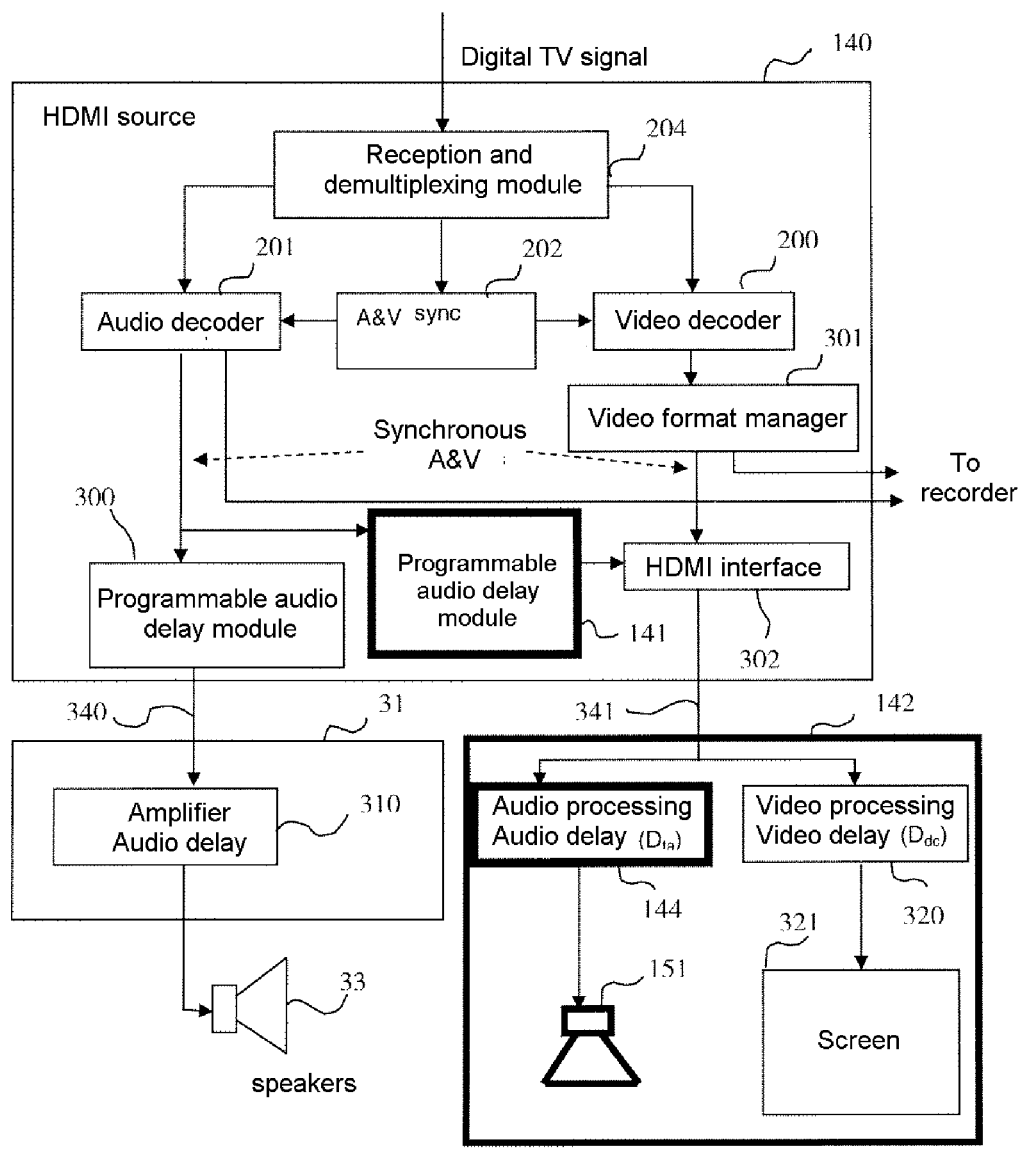
Figure 15:
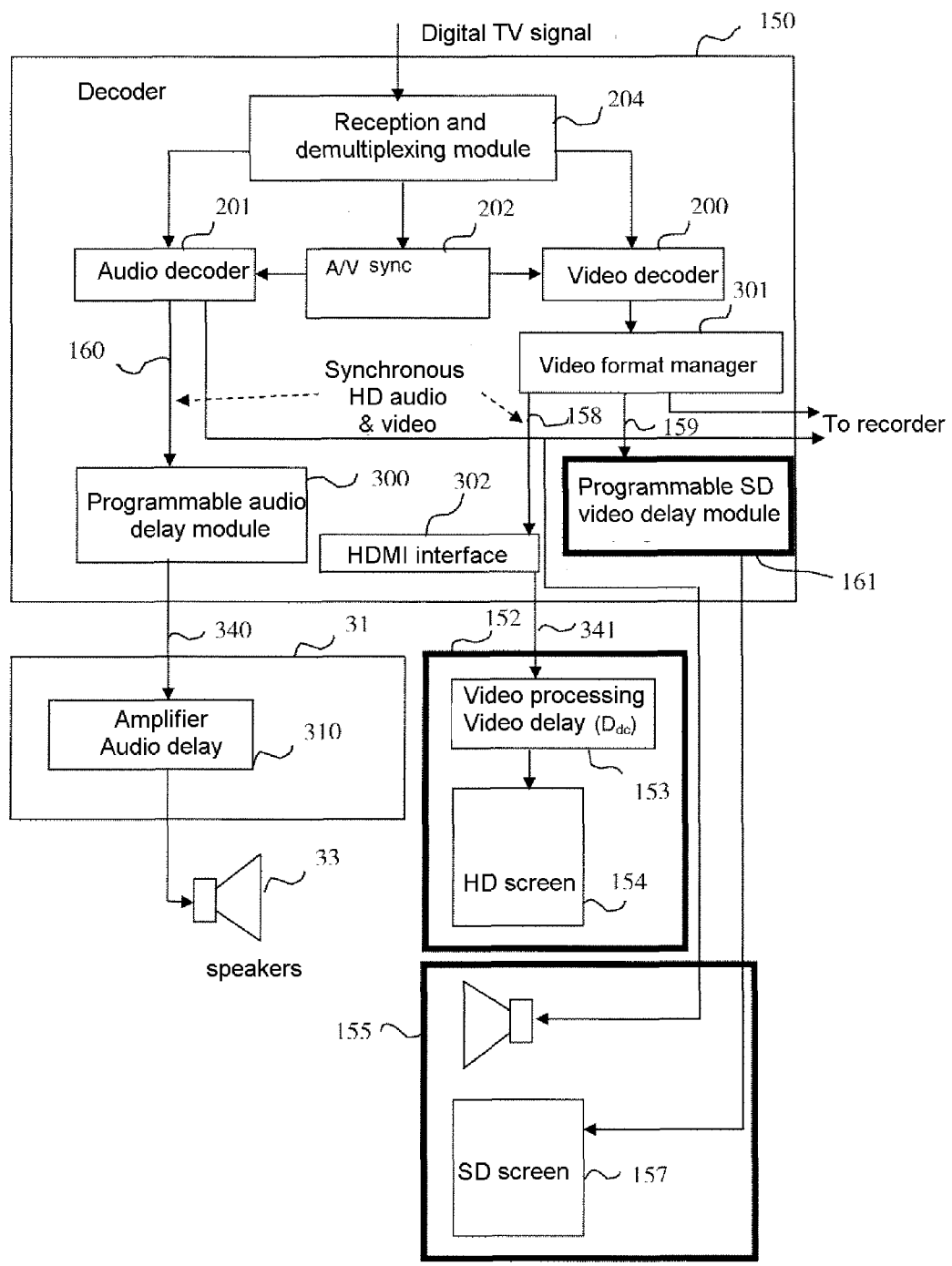

FIG. 14 represents a device for receiving and reproducing an audio/video digital service according to the invention which uses an external audio reproduction device, the reception device including 2 delay modules; and FIG. 15 represents a device for receiving and reproducing an audio/video digital service according to the invention, the reception device being connected to two video reproduction devices.

5. DETAILED DESCRIPTION OF THE INVENTION

The embodiments will be described with particular reference to an audiovisual digital service. The A/V source is likened to a decoder but can be any other type of A/V source (for example, a DVD player). The audiovisual reproduction device is likened to a television including a screen and an audio output (i.e. built-in speaker) but can also be any other type of audiovisual reproduction device (for example a computer). The audio reproduction device can be external to the television and likened to a device including an amplifier linked to one or more speakers (for example, an audio amplifier of a home cinema device) but can also be any other type of audio reproduction device.

Some deinterlacing circuits have compensating audio inputs to which is applied the same delay as to the video to remain in phase. However, in the case where the user chooses to use the sound from an external audio reproduction device (for example of home cinema type), no delay compensation is applied. It therefore seems natural to place the A/V synchronization module in the digital decoder, the latter being the source of the A/V signals and moreover necessarily compatible with A/V equipment already on the market. One of the principles of the invention is to provide automatic means to the television so that the latter can make known to the decoder the value of the delay between the video at the input of the television and the video displayed on the screen.

Figure 3:
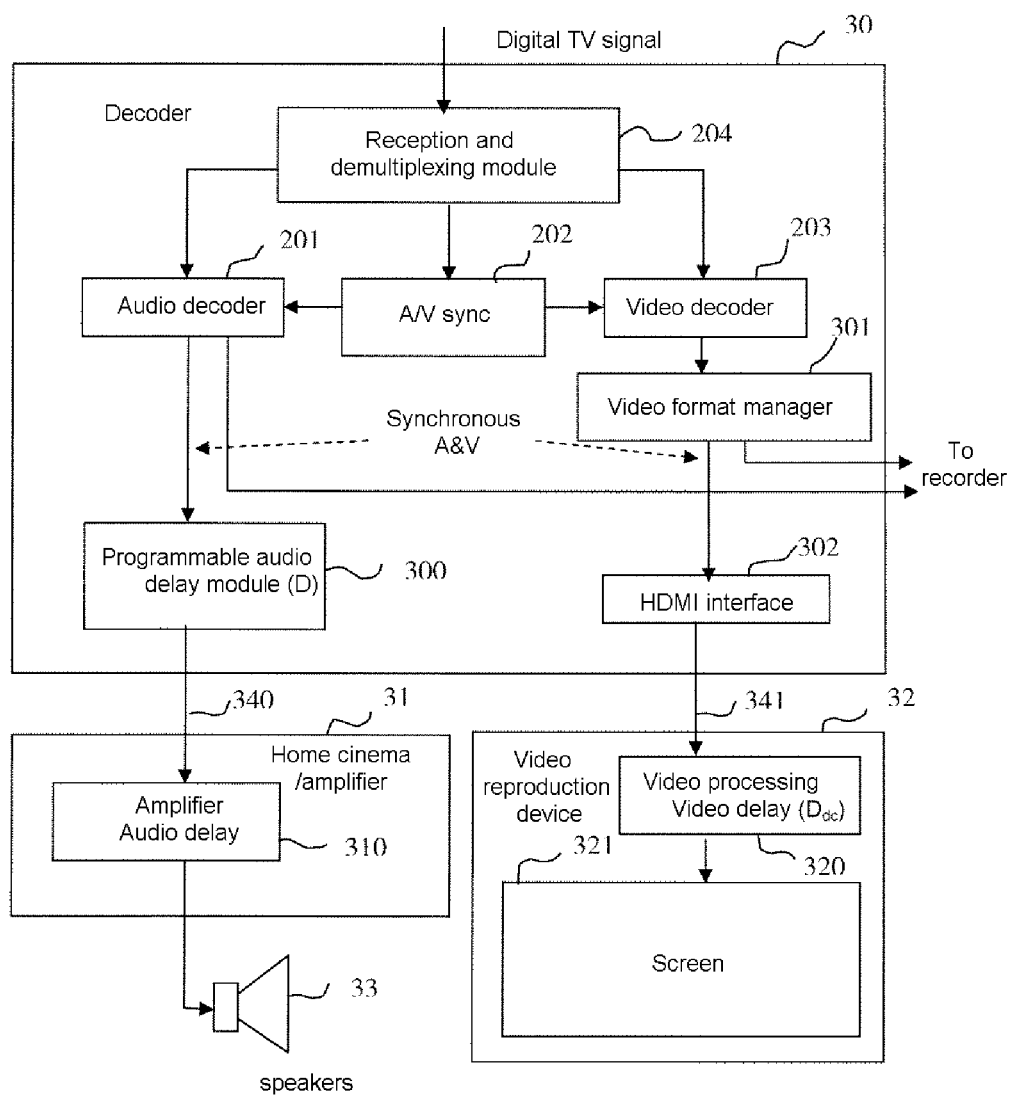
FIG. 3 represents a device for receiving and reproducing an audio/video digital service according to the invention which uses an external audio reproduction device.

FIGS. 2 and 3 represent two variants of a device for receiving and displaying an audiovisual digital service according to the invention. Only the main elements of the device are shown. FIG. 2 represents an audiovisual service device which includes a digital decoder 20 linked to a television 21, in particular by links 220, 221 and 222. The decoder 20 receives at its input an encoded audiovisual stream 22 (for example in MPEG coding). This A/V stream 22 is demultiplexed by a demultiplexer 204 into at least one audio signal and one video signal. The video signal is then decoded by a video decoder 200. As for the audio signal, this is decoded by an audio decoder 201. The two streams are synchronized using the A/V synchronization module 202 which communicates with the two decoders 200 and 201. The A/V synchronization module 202 is, moreover, linked to a processing unit 203. The video decoder 200 is linked to the television 21 via a DVI/HDMI link 220 (DVI/HDMI standing for Digital Video Interface/High Definition Multimedia Interface). More specifically, the video decoder 200 is linked to a video processing module 210 of the television 21. This processing module is in turn linked to a screen 211. As for the audio decoder, this is linked to an audio reproduction device of the television 212 via a link 222. The synchronization module 202 is linked via the unit 203 to a non-volatile memory 213 (for example EDID EPROM, in which EDID stands for Extended Display Identification Data) of the television 21 via an I2C bus 221 using, for example, the DDC communication protocol (Display Data Channel protocol for recovering screen-related data).

FIG. 3 represents a similar device in which the audio stream is reproduced by an external audio reproduction device 31 (for example an amplifier of a home cinema device). This device 31 includes an audio amplifier 310 linked to speakers 33. The decoder 30 includes elements (in particular, audio decoder, video decoder, demultiplexer, A/V synchronization module) similar to those of the decoder 20, elements which are given the same reference numbers. It also includes a programmable audio delay module 300, an HDMI interface 302 and a video format management module 301. It is linked to a television 32 including a video processing module 320 which is in turn linked to a screen 321. The decoder is linked to the external audio reproduction device 31 via a link 340, for example via an SPDIF (Sony/Philips Digital Interface) interface and to the television 32 via a DVI/HDMI link. The objective of the two proposed solutions (FIGS. 2 and 3) is to compensate for a delay $D_{dc}$, in which $D_{dc}=D_d+D_e$, induced by video processes (for example deinterlacing, format conversion, image quality enhancement, etc) 320 210 and/or a delay $D_e$ due to the screen (for example, the response time of the liquid crystals) 211. The delay $D_e$ can itself be the sum of a number of delays such as those defined in the table above. In the rest of the document, the overall delay, i.e. $D=D_{dc}+D_e$, is denoted D. $D_{dc}$ and $D_e$ can be fixed or variable in time, as is the case of the delay $D_e$ for liquid crystal screens for which the response time is variable from frame to frame. In the case where the screen introduces no delay, $D=D_{dc}$. Similarly, $D_{du}$ can be zero.

According to the invention, at least a programmable delay D is applied to the audio signal by storing it either in its compressed form or in its decoded form. The delay D is applied to the audio signal in the module 300. According to a variant of the invention, the delay is directly applied to the audio signal in the A/V synchronization module 202 present in the decoder. The decoder is responsible for applying the appropriate delay value D in the audio delay module 300 or in the A/V synchronization module of the decoder 202 to compensate for the delay induced by the video processes and/or the delay due to the type of screen 210 320.

According to the invention, the delay D induced by the television 21 or 32 can vary according to the format of the input video, the management of which is handled by the module 301. Thus, a new delay value D can be programmed in the audio delay module 300 or in the A/V synchronization module of the decoder 202 each time the video format changes if this delay depends on the video format. This delay is denoted $D_x$, where x is the video format with which the delay is associated. The programmed delay value can also be an overall value D operating independently of the input video format.

The proposed solution therefore consists in enhancing the HDMI/DVI control protocols with parameters that indicate the delays $D_x$, for example, for different video formats, or even the overall delay D independently of the input video format. These protocols enable the screens to share with the decoder information concerning their characteristics and capabilities. According to these protocols, the video source uses the DDC channel 221 to read a non-volatile memory 213 placed in the television 21 or 32 to ascertain, for example, the resolution, the polarities of the synchronization signals and colorimetric data. This data is represented using EDID descriptors which are defined in document EIA/CEA-861B. They can be supplied by the screen manufacturers and programmed in the EPROM EDID memory 213.

The invention therefore consists in adding EDID information descriptors other than those already standardized in order to store in the television information characteristics of the delays introduced either by the digital video processing of the television ($D_{dc}$), or by the response time of the screen ($D_e$), or by both (D or $D_x$). The delay information for each television 21 or 32 equipped according to the invention is stored in a non-volatile memory of the television 213. This information can include the 4 delays $D_x$ corresponding to the 4 video formats described previously (50 Hz interlaced input, 50 Hz progressive input, 60 Hz interlaced input, 60 Hz progressive input). Storing the delays relating to other video formats can also be envisaged.

According to the invention, the decoder recovers these values in order for the A/V synchronization module 202 or the delay module 300 to synchronize the audio and video streams. The information concerning the delays $D_{dc}$ and $D_e$ can be supplied by the manufacturer of the television 21 or 32 and can be transmitted by the television 21 32 to the decoder 20 in electronic form. The overall delay information D or $D_x$ must then be transferred on switching on the decoder. This information can also, optionally, be transferred on a change of channel if necessary or on request to the decoder.

An alternative solution to the use of the DDC channel is to use the CEC (Consumer Electronics Control) interactive interchange protocol specified in HDMI.

Figure 4:
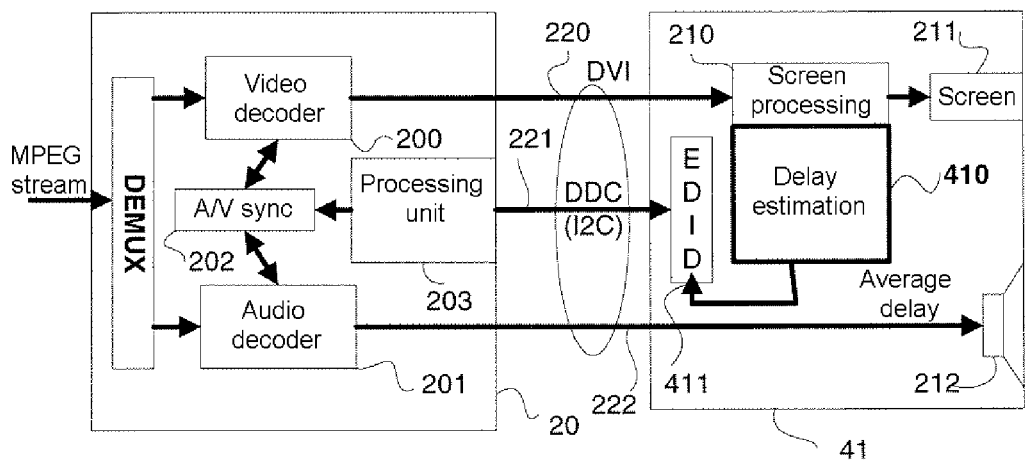
FIG. 4 represents a device for receiving and reproducing an audio/video digital service according to the invention in which the reproduction device estimates a delay compensated in the source.

FIG. 4 illustrates a particular embodiment of the invention. The decoder 20 is the same as the one described in FIG. 2 and will not be described further. The television 41 includes elements similar to the television 21 which are given the same references and will not therefore be described further in detail. The television also includes a module 410 for estimating a delay $D_e$. In practice, for televisions which introduce a delay that is variable in time according to the screen type, this delay must be estimated. This estimated delay $D_e$ is then added to the delay $D_{dc}$ induced by the various video processes (for example, deinterlacing). The value of the overall delay D is stored in an EPROM EDID memory 411 to be used by the A/V synchronization module 202 or the delay module 300 placed in the decoder 20. This delay is therefore recovered by the decoder via the DDC link 221 in order to synchronize the audio and video streams. Storing the different delays ($D_{du}$ and $D_e$) separately in the EPROM EDID memory can also be envisaged, these different delays then being recovered by the decoder via the DDC link 221. To estimate the variable delay $D_e$ due to the screen type, the estimation method described later in the document can be used for liquid crystal display screens.

Figure 5:
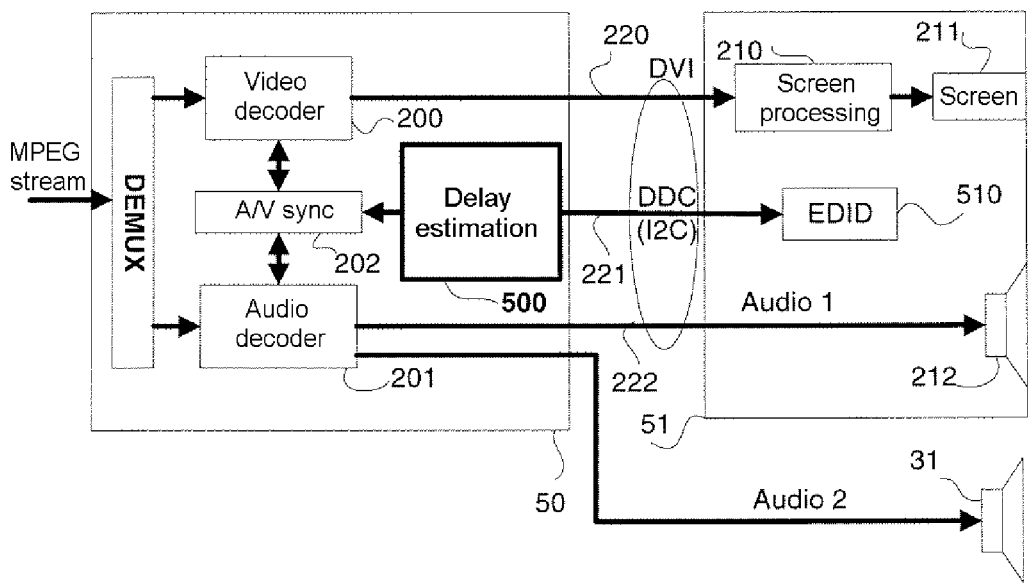
FIG. 5 represents a device for receiving and reproducing an audio/video digital service according to the invention in which the reception device estimates and compensates for a delay.
Figure 8:
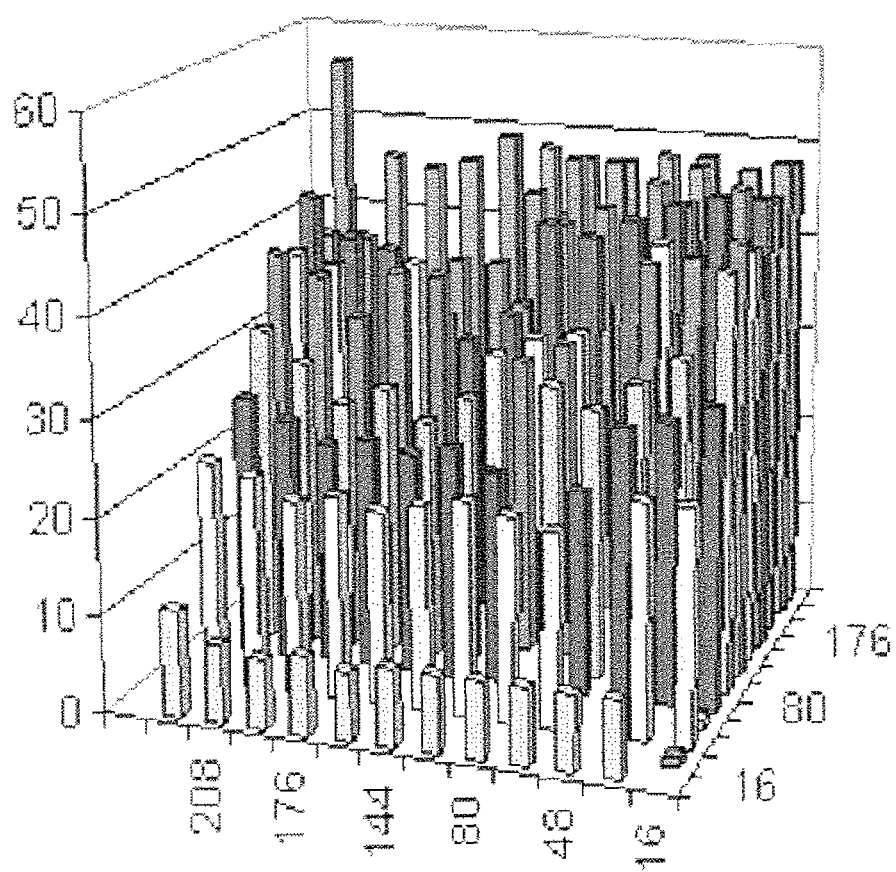
FIG. 8 illustrates a chart representing the response times of liquid crystals for different grey transition levels.

In another embodiment represented in FIG. 5, the delay linked to the screen $D_e$ is estimated in an estimation module 500 located in the processing unit of the decoder 50. The elements similar to the preceding figures are given the same references and will not be described further. According to the invention, it is therefore proposed to define descriptors for storing, in the EPROM EDID memory of the screen, the data needed to estimate the delay (for example, charts as supplied by the liquid crystal suppliers and illustrated in FIG. 8). This data is then recovered via the link 221 by the decoder which itself estimates the average delay in the module 500. For this, it can use the estimation method described later in the document.

One advantage of the solutions described is to synchronize the audio and video streams when using a television and an external audio output device 31 (for example, HiFi system, home cinema device).

Figure 6:
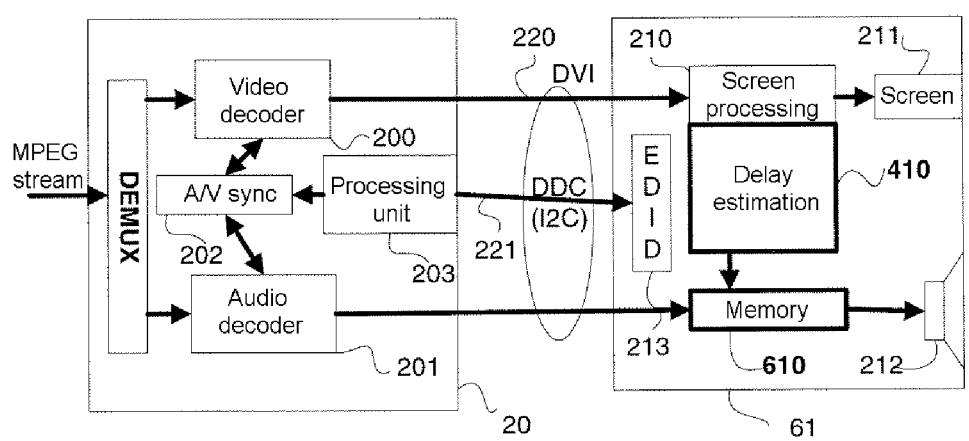
FIG. 6 represents a device for receiving and reproducing an audio/video digital service according to the invention in which the reproduction device estimates and compensates for a delay.

In another embodiment illustrated in FIG. 6, the delay $D_e$ linked to the screen is also estimated in the block 410 of the television 61 as previously. However, the synchronization is carried out directly in the television. In this case, a memory 610 in the television can be used to buffer the audio data and restore it to the user according to the average delay. A method of estimating the average delay is described below.

Figure 7:
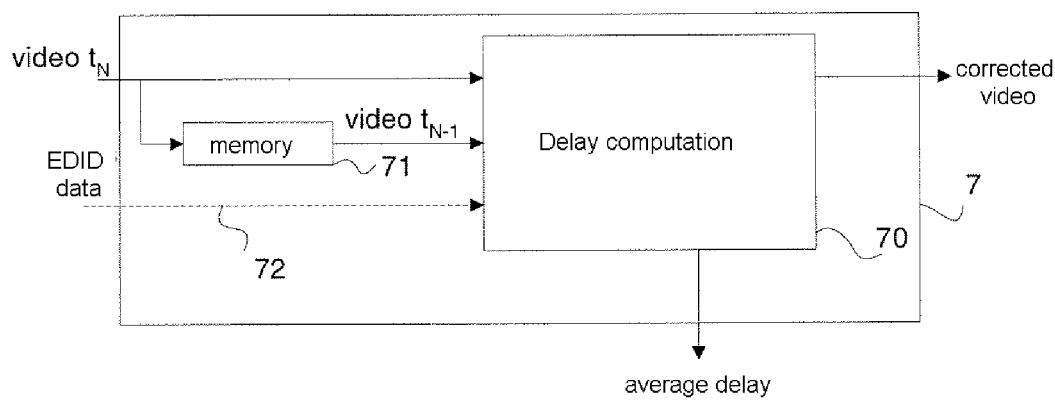
FIG. 7 illustrates a method of estimating delay for liquid crystal screens according to the invention.

FIG. 7 illustrates a device according to the invention for estimating 7 the delay $D_e$ for liquid crystal screens. The device includes a frame memory 71 and a delay computation module 70. The frame memory 71 is used to delay the input video (video $t_N$) by one frame (video $t_{N-1}$). The device 7 can use the frame memory 71 of the enhancement device. The delay computation module 70 computes, for each pixel, the difference in grey levels between two successive frames. This module then uses the charts (FIG. 8) supplied by the liquid crystal manufacturers. These charts give the response times for different grey level transitions. They can thus be used to estimate, for each pixel, the response time between two frames. By constructing a histogram on all the pixels, an average delay $D_e$ is therefore estimated (for example, by calculating a weighted average which takes into account the number of pixels having a given response time) which is used by the A/V synchronization device. In the case where the estimation of the delay $D_e$ is performed in the decoder (FIG.

5), these charts can be stored in the EPROM EDID memory and recovered by the decoder via the DDC link 221. In this case, the delay estimation device 7 then recovers the EDID data via the link 72.

The following solutions propose other embodiments for manually or semi-automatically making known to the video source the delay parameters D induced both by the video processes and by the screen. These solutions are in particular used when there is no HDMI link between the A/V source and the video reproduction device.

Figure 9:
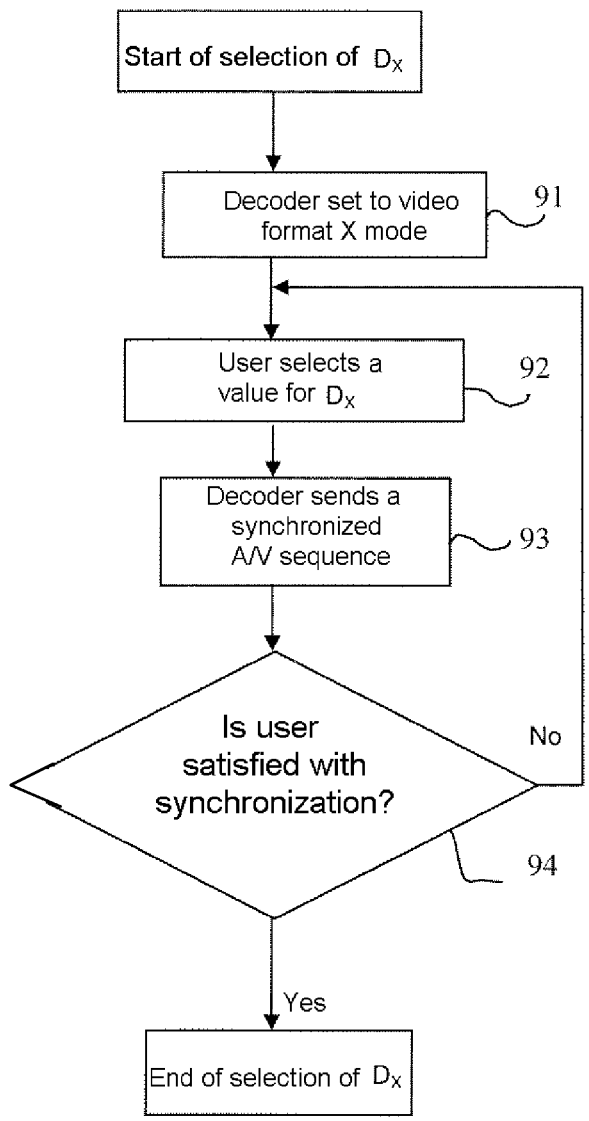
FIG. 9 illustrates a manual delay selection method according to the invention.
Figure 10:
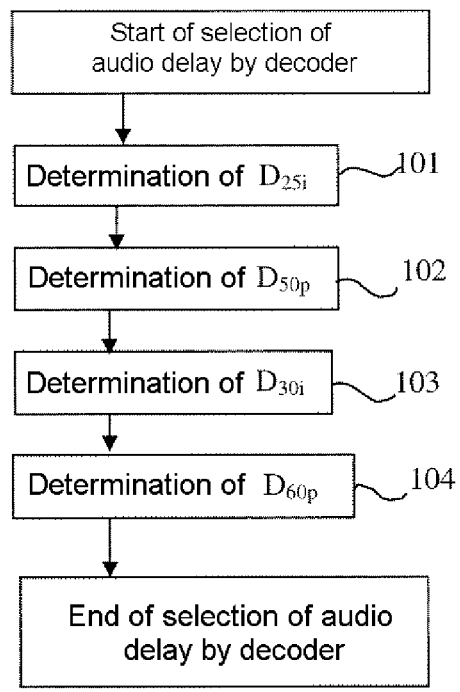
FIG. 10 illustrates a method of selecting delays for different video formats.
Figure 11:
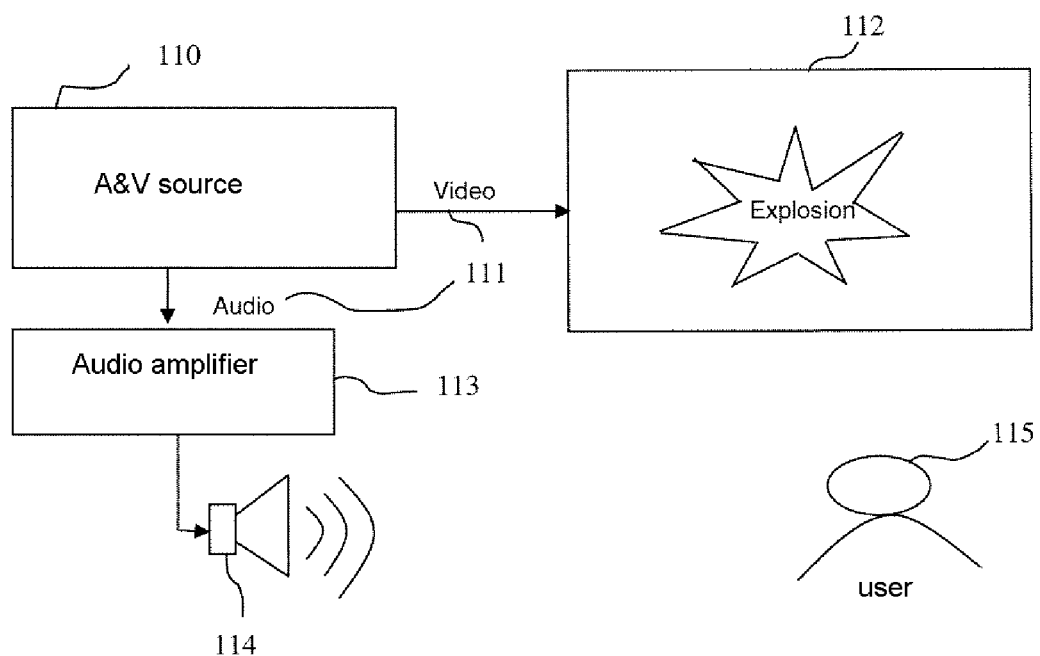
FIG. 11 illustrates a manual delay estimation device according to the invention.

FIG. 9 illustrates a manual tuning method enabling the user to select delay parameters empirically using a menu. The selection device is shown in FIG. 11. This method is useful when no delay information is supplied by the manufacturer. In this case, the decoder 110 generates an A/V sequence enabling the user to synchronize the delay D manually and finely. According to the invention, in a step 91, the decoder 110 switches to the appropriate video format (denoted X, for example 50 Hz interlaced). In a step 92, the user 115 then selects a delay value $D_x$ from the menu for this format. The value is programmed in the audio delay module of the decoder 300 or in the A/V synchronization module 202. In a step 93, the decoder then sends the synchronized A/V sequence 111 using the selected delay value. The video is then displayed on the screen 112. The synchronized audio signal is amplified by the audio amplifier 113 and the sound is reproduced using speakers 114. The user can judge the quality of synchronization by watching the screen 112 and listening to the sound produced by the speakers 114. In a step 94, the user informs the decoder using the menu as to whether the synchronization is accurate enough for him. If not, the process is then repeated with a new delay value D. If the synchronization is satisfactory, the selection is ended and the value of $D_x$ is stored in the programmable delay module 300 or in the A/V synchronization module 202.
This operation can be repeated for any video format in order to determine, for each, the delay that should be applied to the audio stream. This method is illustrated in FIG. 10. The delays $D_{25i}$ (relating to the 50 Hz interlaced video format), $D_{50p}$ (relating to the 50 Hz progressive video format), $D_{30i}$ (relating to the 60 Hz interlaced video format) and $D_{60p}$ (relating to the 60 Hz progressive video format) determined, in the steps 101, 102, 103 and 104 respectively, are selected in turn according to the method described in FIG. 9.

According to another embodiment, since the delay is known because it is, for example, supplied by the manufacturer, the user can use a menu to manually enter the delay values $D_x$ to be applied in the delay module 300 or in the A/V synchronization module 202 of the decoder for example for different video formats. These values may be, for example, entered on installing the digital service device.

Figure 12:
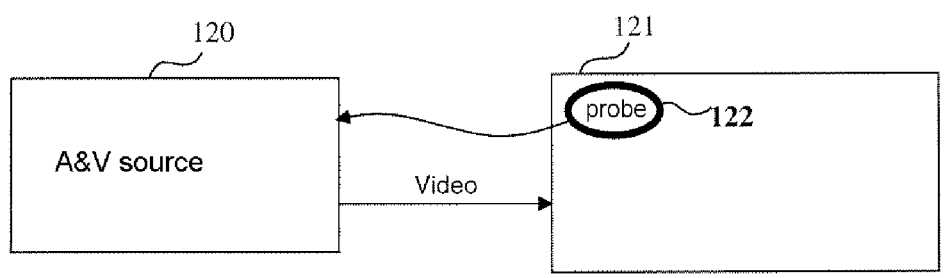
FIG. 12 illustrates a semi-automatic delay estimation device according to the invention.
Figure 13:
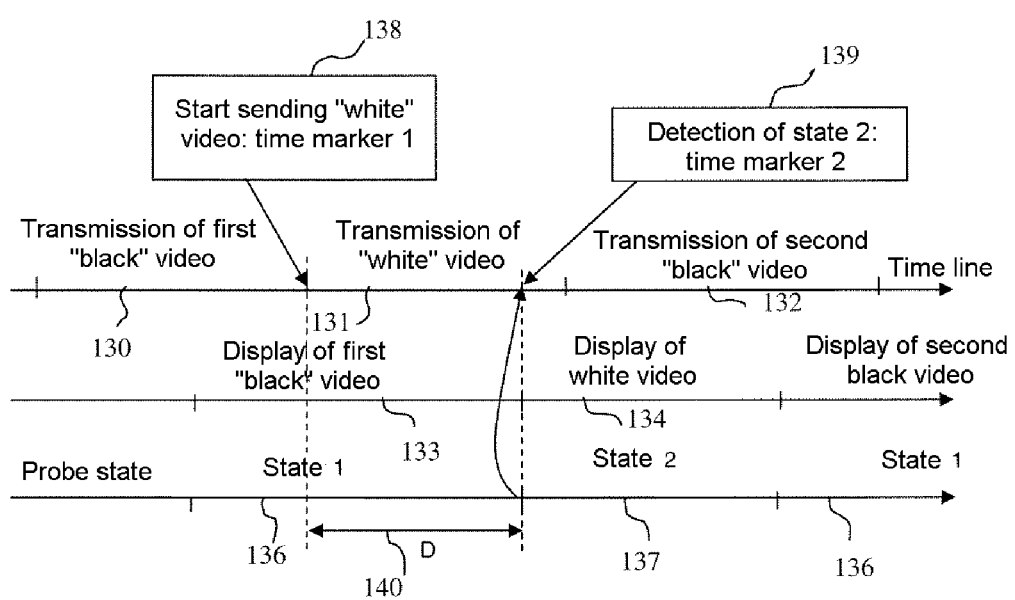
FIG. 13 illustrates a semi-automatic delay estimation method according to the invention.

According to another device illustrated in FIG. 12, a probe 122 is used, fixed to the screen in order to detect characteristics of what is displayed on the screen and return this information to the decoder. Such a semi-automatic method of estimating the delay D is illustrated in FIG. 13.

According to this method, the decoder 120 generates a series of black images 130 (i.e. of low grey levels), then a single white image 131 (i.e. of high grey levels) and a series of black images 132 again, which it sends to the television 121. The first series of black images is then displayed 133 on the screen, followed by the white image 134 and finally the second series of black images 135. The probe 122 is capable of detecting a white image on the screen and of sending an instantaneous message to the decoder 120 to inform it of the display 134 of this white image. The decoder 120 computes the time elapsed between the moment 138 at which the white image was sent by the decoder and the moment 139 at which it was displayed on the screen of the television 121. The probe 122 is typically a device that is sensitive to light intensity and that can be positioned against the screen, for example in the top left corner of the screen or even in the middle of the screen. It is, moreover, capable of instantaneously evaluating the light intensity over a limited area of the screen. The probe 122 has 2 logic states. It is in a first state 136 when the light intensity level detected is below a certain threshold (i.e. on displaying the first series of black images) and in a second state 137 when the level is above the threshold (i.e. on displaying the first series of white images). The threshold is determined such that, when a black image is displayed, the probe is in the first state and, when a white image is displayed, the probe is in the second state. The black image can be replaced with an image of low light intensity and the white image with an image of high intensity. All that is needed is for the probe to be capable of detecting the transition from one to the other. Its logic state can be translated into an electrical signal having 2 values. This signal can then be recovered by the decoder. The decoder stores the time 138 from which the white image starts being sent to the screen and stores the time 139 at which the probe detects the transition from the first state to the second state. The difference D 140 between these 2 time markers represents the delay induced by the video processes and the screen. This operation can be repeated for various video formats in order to obtain a set of delays $D_x$ for all the video formats. This method is semi-automatic since, even if no menu is used, the user must connect the probe to the decoder, apply it to the screen and begin the process manually.

It is also possible to envisage having a blue screen with a black square displayed somewhere on this screen. With the probe 122 positioned on the black square, white is sent to the black square in order for the probe to detect the change of light intensity. Knowing the position of the probe on the screen means the delay can be measured more precisely for screens that do not reproduce all the pixels simultaneously (for example, for scanning screens).

Another application of the present invention is disclosed in FIG. 14. The elements common to FIGS. 2 and 3 are given the same references and will not be described further. The decoder 140 includes an additional programmable audio delay module 141. This second module is used to synchronize the audio and video streams that will be reproduced by the same reproduction device 142 (for example a television). This television 142 includes a video processing module 320 which induces a delay $D_{dc}$ on the video. It also includes an audio processing module 144 which induces a delay $D_{ta}$ on the audio stream. This module is in turn connected to speakers 151 built into the television. In order for the audio and video streams reproduced by the built-in speakers 151 and the screen 321 to be synchronized, the second programmable audio delay module 141 applies to the audio stream output from the decoder a delay $(D_{dc}-D_{ta})$. In this example, it is proposed to add to the EDID table 4 parameters relating to the video delays $D_{dc}$ introduced by the reproduction device which depend on the video format:
50 Hz interlaced input
50 Hz progressive input
60 Hz interlaced input
60 Hz progressive input
4 parameters relating to the delay $D_{ta}$ introduced by the audio processing system for the above 4 video formats are also added. The delay values can be encoded on 1 byte in order to represent delay values varying from 0 to 255 milliseconds. Thus, in the case where the audio stream is reproduced by an external device 31 (for example SPDIF), the source applies a delay $D_{dc}$ (module 300) to the audio stream at the output of the decoder 201. In the case where the audio stream is reproduced by the HDMI reproduction device (for example a television) 142, the source 140 applies to it a delay ($D_{dc}$–$D_{ta}$), via the module 141, which takes account of the video and audio delays introduced by the different processing systems of said HDMI device 142.

A different application is illustrated in FIG. 15. The elements common to FIGS. 2 and 3 are given the same references and will not be described further. The decoder 150 is connected to two televisions 152 and 155 located in two different rooms. The television 152 is linked to a home cinema type device 31 for audio output (for example, via an SPDIF interface). The television 155 which mainly includes a screen 157 and which is located in another room, receives the audio and video streams together via a link 162 (for example scart or analogue RF). The television 152 includes a video processing module 153 introducing a delay $D_{du}$ and a screen 154. As for the television 155, it maintains the synchronization of the audio and video streams that are transmitted together to it. According to the invention, a device is proposed that has a single audio output which is synchronized with any one of the video outputs. The solution according to the invention consists in synchronizing, in the decoder, the audio stream with the first video output 158 as already described with reference to FIG. 3 (that is, by applying a compensating delay to the audio). A second programmable delay module 161 is added which will apply to the second video output 159 the same delay $D=D_{dc}$ as to the audio output in order for the second video output 159 to be synchronized with the audio output 160. This solution in particular makes it possible to use the second television 155 in another room with the audio output of this same television and to have only one and the same audio output 160 operating with both video outputs 158 and 159.

The invention described in the context of the DVI and HDMI communication protocols could be extended to any control protocol developed in the future, provided that it allows for the interchanging of such delay data or data for computing delays in the decoder (for example, charts).

The invention is disclosed in the context of the synchronization of audio and video streams of a digital service, in the case where the screen introduces a delay whereas the audio part of the digital service is associated with an instantaneous process. It can be generally applied to any type of device for reproducing any digital service, said service being separated into different parts processed by different reproduction devices, each of them applying specific delays to the part of the service that it handles. In this case, the capability of communicating the specific delay of the reproduction device to the source device enables the latter to synchronize all the parts of the digital service between themselves for good reproduction of the complete service.

The invention claimed is:

1. Device for reproducing at least one part of data corresponding to at least one digital service originating from a digital service source device comprising a first receiver for receiving first data forming a first part of the digital service, a first processing unit for processing said first received data, a first reproduction unit for reproducing an output of said first processed data, the time for processing and/or reproducing the first received data introducing a first delay-in the output of the first reproduced data,
wherein said reproduction device further comprises a second receiver for receiving second data forming a second part of the digital service, a second processing unit for processing said second received data, a second reproduction unit for reproducing an output of said second processed data, the time for processing and/or reproducing the second data introducing a second delay in the output of the second reproduced data and wherein the device also comprises a communication unit for informing the source device of said first delay and said second delay, wherein said communication unit comprises a memory configured to store values for said delay relating to said first data for different first data formats and configured to store values for said delay relating to said second data for different first data formats.

2. Device acting as a digital service source, comprising a unit for outputting first data forming a first part of a digital service, a unit for outputting second data forming a second part of the digital service, wherein it also comprises a unit for recovering according to the format of the first data from a device for reproducing at least said first data a first delay indication relating to said first data and a second delay indication relating to said second data, a delay unit for applying a programmable delay to the output data forming the second part of the digital service according to said first and second delay indications recovered.

3. Device according to claim 2, wherein said delay unit applies a programmable delay to the output data forming the second part of the digital service equals to the difference between said first delay indication recovered and said second delay indication recovered.

4. Method for reproducing at least one part of data corresponding to at least one digital service comprising the steps of:
receiving first data forming a first part of a digital service;
processing said first received data;
reproducing an output of said first processed data, the time for processing and/or reproducing the first received data introducing a first delay in the output of the first reproduced data,
wherein said reproduction method further comprises:
receiving second data forming a second part of the digital service;
processing said second received data;
reproducing an output of said second processed data, the time for processing and/or reproducing the second received data introducing a second delay in the output of the second reproduced data,
storing, in a memory, values for said delay relating to said first data for different first data formats and values for said delay relating to said second data for different first data formats.

5. Method for transmitting data corresponding to at least one digital service, comprising the steps of:
outputting first data forming a first part of the digital service;
outputting second data forming a second part of the digital service;
wherein said method further comprises the steps of:
recovering, according to the format of the first data, a first delay indication relating to a delay introduced when processing and/or reproducing said first data;
recovering, according to the format of the first data, a second delay indication relating to a delay introduced when processing and/or reproducing said second data; and
applying a programmable delay to the output data forming the second part of the digital service according to said first and second delay indications recovered.

6. Method according to claim 5, wherein the programmable delay equals to the difference between said first delay indication recovered and said second delay indication recovered.

7. Method according to claim 1, wherein said first data are video data and said second data are audio data.

8. Method according to claim 2, wherein said first data are video data and said second data are audio data.

9. Method according to claim 4, wherein said first data are video data and said second data are audio data.

10. Method according to claim 5, wherein said first data are video data and said second data are audio data.

\* \* \* \* \*